(12) United States Patent
Nelson

(10) Patent No.: US 7,970,387 B2
(45) Date of Patent: Jun. 28, 2011

(54) METHOD AND SYSTEM FOR PERSONALIZING A CALL SET-UP PERIOD

(75) Inventor: Joakim Nelson, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 801 days.

(21) Appl. No.: 11/380,037

(22) Filed: Apr. 25, 2006

(65) Prior Publication Data
US 2007/0249326 A1 Oct. 25, 2007

(51) Int. Cl.
H04M 3/42 (2006.01)

(52) U.S. Cl. ............ 455/414.1; 455/409; 455/412.1; 455/412.2; 455/415; 455/418; 455/550.1; 455/566; 455/567; 379/82; 379/106.05; 379/106.09; 379/179; 379/207.16; 379/252; 379/418

(58) Field of Classification Search .......... 455/414.1, 455/415, 418, 550.1, 567, 409, 412.1, 412.2, 455/566; 379/82, 106.05, 106.09, 179, 207.16, 379/252, 418
See application file for complete search history.

(56) References Cited

U.S. PATENT DOCUMENTS

| 7,400,882 B2* | 7/2008 | Hahm et al. ............... 455/414.1 |
| 2004/0114732 A1 | 6/2004 | Choe et al. |
| 2005/0014521 A1* | 1/2005 | Kramarz-Von Kohout .. 455/510 |
| 2005/0091407 A1* | 4/2005 | Vaziri et al. .................. 709/246 |
| 2005/0172154 A1* | 8/2005 | Short et al. .................... 713/201 |
| 2005/0180554 A1* | 8/2005 | Alston et al. ............. 379/207.16 |
| 2006/0023862 A1* | 2/2006 | Sutcliffe ....................... 379/257 |
| 2006/0111085 A1* | 5/2006 | Lee ............................. 455/412.2 |
| 2007/0153987 A1* | 7/2007 | Cameron et al. ............. 379/67.1 |

OTHER PUBLICATIONS

Borne, Steven, "Ringback Tones, Revenue at our Doorstep", Oct. 6, 2004, pp. 1-3.

* cited by examiner

Primary Examiner — Nick Corsaro
Assistant Examiner — Amanuel Lebassi
(74) Attorney, Agent, or Firm — Renner, Otto, Boisselle & Sklar, LLP

(57) ABSTRACT

A method of personalizing a call set-up of a mobile radio terminal includes acquiring contact information associated with a callable device. The contact information includes call set-up audio data corresponding to audio content selected by a user of the device. The contact information is stored as an entry in a database maintained by the mobile radio terminal. The audio content corresponding to the call set-up audio data is played back when the entry is selected.

24 Claims, 3 Drawing Sheets

METHOD AND SYSTEM FOR PERSONALIZING A CALL SET-UP PERIOD

TECHNICAL FIELD OF THE INVENTION

The present invention relates generally to electronic equipment, such as mobile electronic equipment for engaging in voice communications. More particularly, the invention relates to a method and system for personalizing a call set-up period by playing audio content to the user where such audio content is selected by the user of a called device.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability and hands-free headset interfaces.

To enhance a user's experience with items of electronic equipment, some items of electronic equipment allow for customization of certain features. For example, in many mobile telephones, the user may configure the mobile telephone to play a particular ring tone to announce that a call is incoming. The ring tone replaces a default telephone ringing sound and may be selected by the user. Typically, the ring tone is derived from a song or music selected by the user.

As the popularity of adding individualized mobile telephone functionality increases, so does the need for more functions that may be customized.

SUMMARY

According to an aspect of the invention, a method of personalizing a call set-up of a mobile radio terminal includes acquiring contact information associated with a callable device, the contact information including call set-up audio data corresponding to audio content selected by a user of the device, and storing the contact information as an entry in a database maintained by the mobile radio terminal; selecting the entry; and playing back the audio content corresponding to the call set-up audio data for the selected entry.

According to another aspect, the method further includes initiating a call to the device associated with the selected entry and wherein the playback is commenced only in association with the call initiation.

According to another aspect, the method further includes initiating a call to the device associated with the selected entry and stopping the playback upon detecting an off-hook condition of the called device.

According to another aspect, the method further includes initiating a call to the device associated with the selected entry after the playback has commenced.

According to another aspect, the playback is automatic upon selection of the entry.

According to another aspect, the call set-up audio data is a ring tone or audio file stored by the mobile radio terminal.

According to another aspect, the call set-up audio data is link to a ring tone or audio file stored outside the mobile radio terminal.

According to another aspect, the playback includes receiving the ring tone or audio file from a communications network.

According to another aspect of the invention, a program stored on a machine usable medium includes a call set-up function executable by a mobile radio terminal. The program includes executable logic to acquire contact information associated with a callable device, the contact information including call set-up audio data corresponding to audio content selected by a user of the device, and store the contact information as an entry in a database maintained by the mobile radio terminal; select the entry; and playback the audio content corresponding to the call set-up audio data for the selected entry.

According to another aspect, the program further includes logic to initiate a call to the device associated with the selected entry and wherein the playback is commenced only in association with the call initiation.

According to another aspect, the program further includes logic to initiate a call to the device associated with the selected entry and stop the playback upon detecting an off-hook condition of the called device.

According to another aspect, the program further includes logic to initiate a call to the device associated with the selected entry after the playback has commenced.

According to another aspect, the playback under the program is automatic upon selection of the entry.

According to another aspect, the call set-up audio data is a ring tone or audio file stored by the mobile radio terminal.

According to another aspect, the call set-up audio data is link to a ring tone or audio file stored outside the mobile radio terminal.

According to another aspect, the playback logic under the program includes logic to receive the ring tone or audio file from a communications network.

According to another aspect of the invention, a mobile radio terminal includes a radio circuit for exchanging data with a communications network and a processor. The processor executes logic to acquire contact information associated with a callable device, the contact information including call set-up audio data corresponding to audio content selected by a user of the device, and store the contact information as an entry in a database maintained by the mobile radio terminal; select the entry; and playback the audio content corresponding to the call set-up audio data for the selected entry.

According to another aspect, the processor executes logic to initiate a call to the device associated with the selected entry and wherein the playback is commenced only in association with the call initiation.

According to another aspect, the processor executes logic to initiate a call to the device associated with the selected entry and stop the playback upon detecting an off-hook condition of the called device.

According to another aspect, the processor executes logic to initiate a call to the device associated with the selected entry after the playback has commenced.

According to another aspect, the playback of the mobile radio terminal is automatic upon selection of the entry.

According to another aspect, the call set-up audio data is a ring tone or audio file stored by a memory the mobile radio terminal.

According to another aspect, the call set-up audio data is link to a ring tone or audio file stored outside the mobile radio terminal.

According to another aspect, the playback logic executed by the processor includes logic to receive the ring tone or audio file from a communications network.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
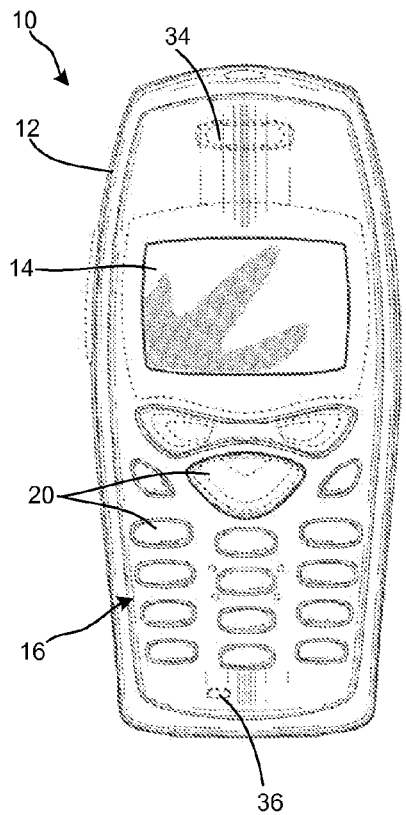
FIG. 1 is a schematic view of a mobile telephone as an exemplary electronic equipment in accordance with an embodiment of the present invention.

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," includes all equipment such as mobile telephones, pagers, communicators, i.e., electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of electronic equipment.

Referring initially to FIG. 1, an electronic equipment 10 is shown in accordance with the present invention. The electronic equipment includes a call set-up function that is configured to personalize a call set-up period with audio playback based on an audio content selection made by a user of the called device. It will be appreciated that the call set-up function may be embodied as executable code that may be resident in the electronic equipment 10.

The electronic equipment in the exemplary embodiment is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized without departing from the scope of the invention.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

Figure 2:
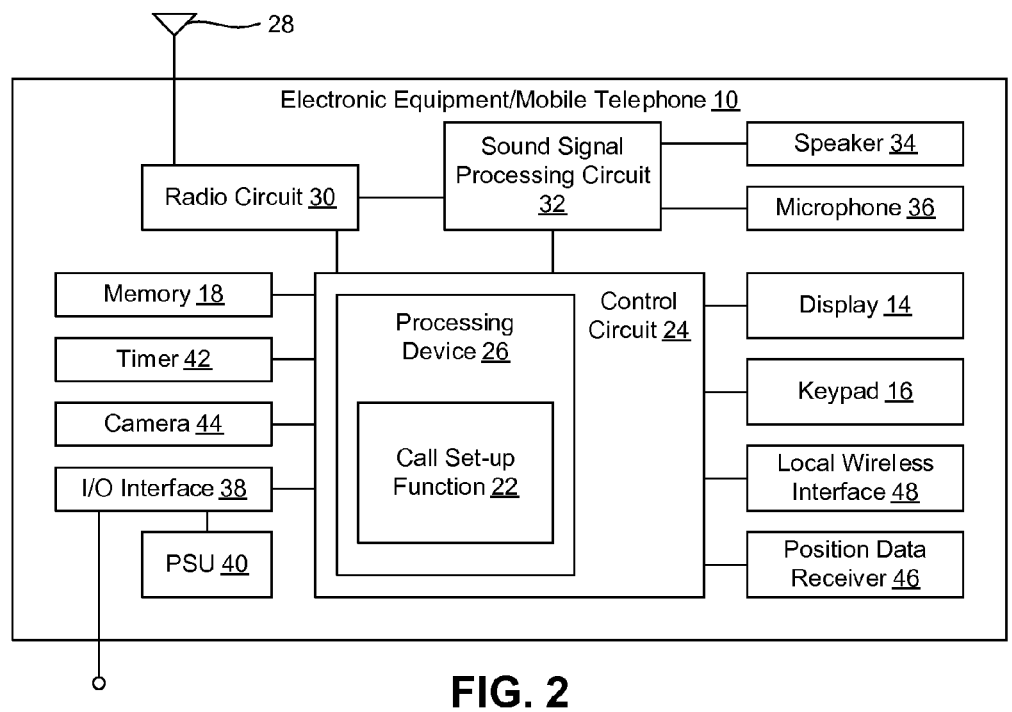
FIG. 2 is a schematic block diagram of the relevant portions of the mobile telephone of FIG. 1 in accordance with an embodiment of the present invention.

FIG. 2 represents a functional block diagram of the mobile telephone 10. With the exception of a call set-up function 22, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform the call set-up function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the alias processing function 22 is executed by the processing device 26 in accordance with the preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. A video decoder (not shown) may be used to convert video data received by the radio circuit 30 or retrieved from a file stored by the memory 18 in to a video signal used to drive the display 14. The mobile telephone may further include any appropriate video and/or audio buffers for buffering video and/or audio data.

The mobile telephone 10 further includes one or more I/O interface(s) 38. The I/O interface(s) 38 may be in the form of typical mobile telephone I/O interfaces and may include one or more electrical connectors. As is typical, the I/O interface (s) 38 may be used to couple the mobile telephone 10 to a battery charger to charge a battery of a power supply unit (PSU) 40 within the mobile telephone 10. In addition, or in the alternative, the I/O interface(s) 38 may serve to connect the mobile telephone 10 to a wired personal hands-free adaptor (not shown). Further, the I/O interface(s) 38 may serve to connect the mobile telephone 10 to a personal computer or other device via a data cable or wireless link, etc. The mobile telephone 10 may receive operating power via the I/O interface(s) 38 when connected to a vehicle power adapter or an electricity outlet power adapter.

The mobile telephone 10 may also include a timer 42 for carrying out timing functions. Such functions may include timing the durations of calls, generating the content of time and date stamps, etc. The mobile telephone 10 may include a camera 44 for taking digital pictures and/or movies. Image and/or video files corresponding to the pictures and/or movies may be stored in the memory 18. The mobile telephone 10 also may include a position data receiver 46, such as a global positioning system (GPS) receiver, Galileo satellite system receiver or the like. The mobile telephone 10 also may include a local wireless interface 48, such as an infrared transceiver and/or an RF adaptor (e.g., a Bluetooth adapter), for establishing communication with an accessory, hands-free adaptor, computer or other device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth. Processing such data may include storing the data in the memory 18, executing applications to allow user interaction with data, displaying video and/or image content associated with the data, broadcasting audio sounds associated with the data and so forth.

Figure 3:
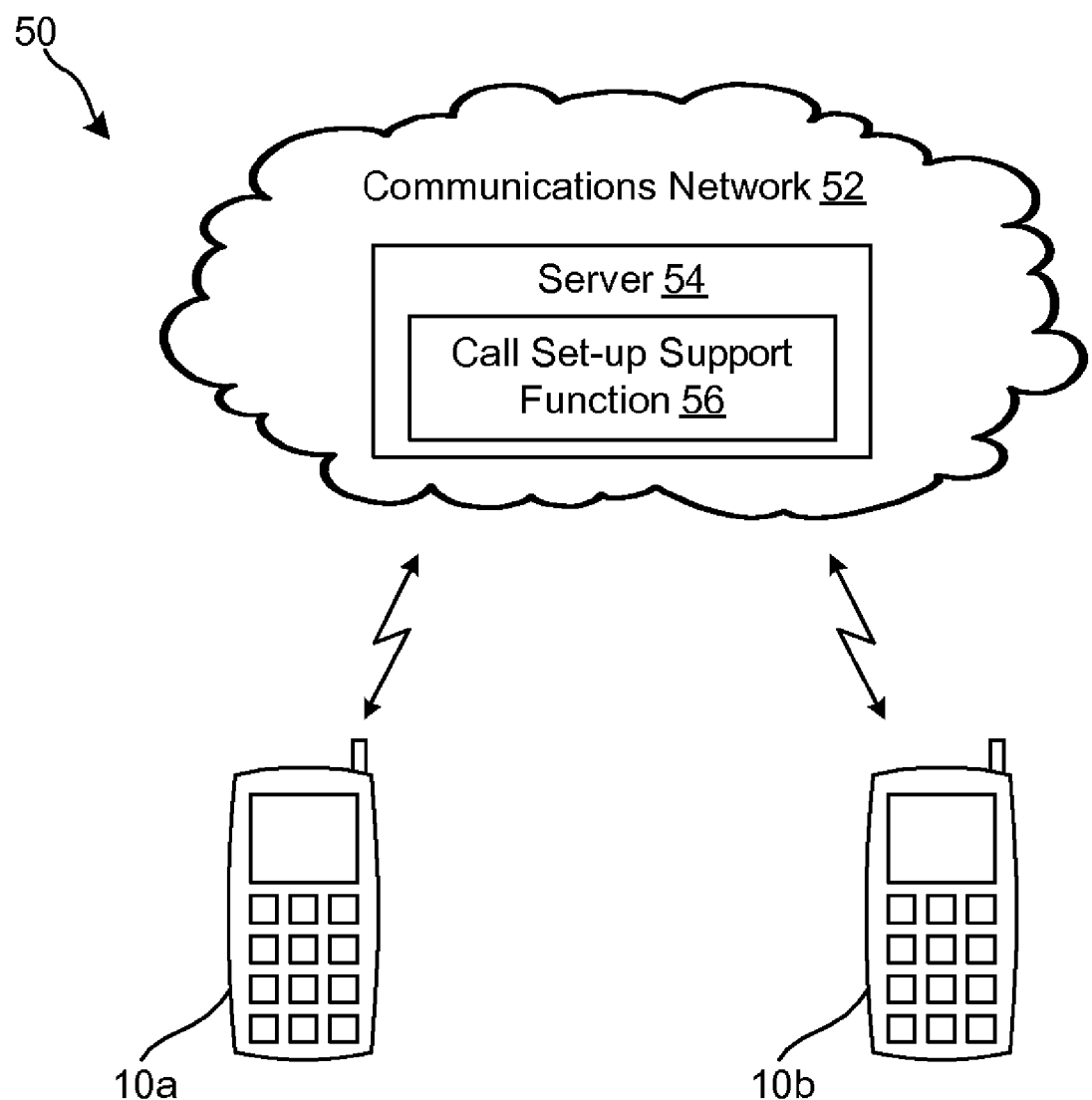
FIG. 3 is a schematic diagram of a communications system in which the mobile telephone of FIG. 1 may operate.

With additional reference to FIG. 3, the mobile telephone 10 may be configured to operate as part of a communications system 50. The system 50 may include a communications network 52 having a server 54 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways.

The network 52 may support the communications activity of multiple mobile telephones 10. In the illustration of FIG. 3, two mobile telephones 10 are illustrated as part of the system 50. For the purposes of the description herein, these mobile telephones 10 will be referred to as a first mobile telephone 10a and a second mobile telephone 10b.

In an example description of the operation of aspects of the present invention that follows, the first mobile telephone 10a has received profile information for the second mobile telephone 10b and the first mobile telephone 10a initiates a call set-up to place a call to the second mobile telephone 10b. The profile of the second mobile telephone 10b stored by the first mobile telephone 10b includes audio data (e.g., an audio file, a ring tone, or a link to an audio file or ring tone stored by the server 54) that has been selected by the user of the second mobile telephone 10b.

In the illustrated embodiment, each of mobile telephones 10a and 10b are configured to include the call set-up function 22. It will be appreciated, however, that the second mobile telephone 10b need not be a mobile telephone and/or need not include all or part of the call set-up function 22. For example, instead of the exemplary mobile telephone 10b, the second mobile telephone 10b may be a voice over Internet protocol (VoIP) telephone, a conventional POTS telephone, a computing device or other suitable device. Accordingly, the second mobile telephone 10b may be referred to as a device to be called or a called device. The profile of the second mobile telephone 10b stored by the first mobile telephone 10a may be referred to as a contact list entry or a phonebook entry, which may be stored in a database maintained by the first mobile telephone 10a (e.g., a contact list or phone book stored in the memory 18).

In one embodiment, the server 54 may operate in stand alone configuration relative to other servers of the network 52 or may be configured to carry out multiple communications network 52 functions. As will be appreciated, the server 54 may be configured as a typical computer system used carry out server functions and may include a processor configured to execute software containing logical instructions that embody the functions of the server 54. Those functions may be complimentary to the operation of the call set-up function 22 of the mobile telephone(s) 10, and will be collectively referred to as a call set-up support function 56.

Figure 4:
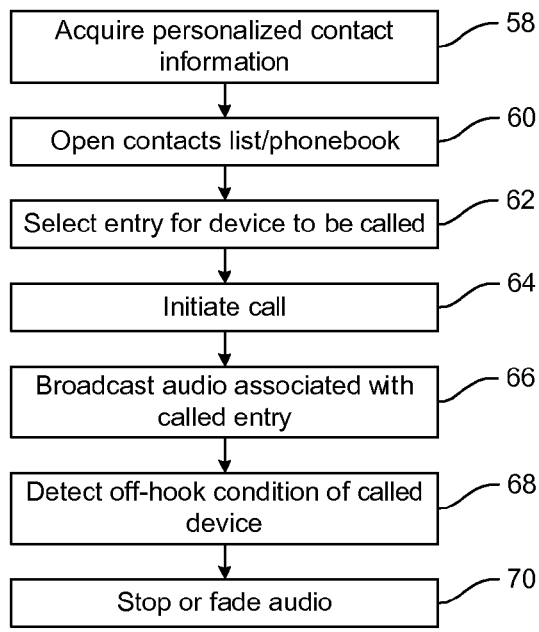
FIG. 4 is a flow chart showing an exemplary personalized call set-up scheme in accordance with the present invention.

With additional reference to FIG. 4, shown is a flow chart depicting an exemplary method of personalizing a call set-up. The method may be embodied as executable code, such as in the form of the call set-up function 22.

The method may begin in step 58 where the first mobile telephone 10a acquires personalized information about the second mobile telephone 10b. The personalized information may include contact information typically stored in a contact list or phonebook of the first mobile telephone 10a. For instance, the personalized information may include a phone number of the second mobile telephone 10b, a name of the user of the second mobile telephone 10b, address information, and so forth.

The personalized information may further include call set-up audio data. The call set-up audio data may be stored by the first mobile telephone 10a in the memory 18, such as in the form of an audio file or a ring tone. In another embodiment, the call set-up audio data may be a link to an audio file or ring tone stored by a memory of the server 54, stored by a memory of the mobile telephone 10b, or stored by another device (e.g., a secondary server, a computer, the second mobile telephone 10b, etc.) so that the linked audio data may be retrieved by the first mobile telephone 10a or pushed thereto for playback to the user at an appropriate time in the method.

The personalized information, including the call set-up audio data, may be acquired by the first mobile telephone 10a in a number of ways. For example, the personalized information may be obtained using a personal data interchange (PDI), such as in the form of a Vcard or a VCalendar. In another example, the personalized information may be obtained by visiting a webpage for the user of the second mobile telephone 10b that contains a personal profile that is downloaded or pushed to the first mobile telephone 10b. The webpage may be found by an Internet search or by using a known address (e.g., a known uniform resource locator or URL). In another example, the personalized information may be obtained while the mobile telephones 10a and 10b are in close proximity to each other and have established an interface, such as through a local wireless interface (e.g., IR interface or Bluetooth interface). In another example, the personalized information may be posted to the first mobile telephone 10 through an electronic mail message. Other example data acquisition techniques are possible and include, without limitation, a data exchange such as during a contact list update, manual entry by a user, etc.

With continued reference to the figures, the method may continue in block 60 where the user of the first mobile telephone 10a opens a contact list or phonebook. In block 62, using a user interface, the user may select an entry corresponding to a device to be called, such as the second mobile telephone 10b. For example, the user may scroll though a list of contacts to arrive at the desired entry or may use a search function to find the desired entry. Thereafter, a call to the device associated with the selected entry is initiated in block 64 by dialing the appropriate telephone number. For example, such a call may be initiated by the user pressing a call send button.

In block 66, the first mobile telephone 10a may broadcast audio corresponding to the call set-up audio data for the selected entry to the user of the first mobile telephone 10a. The sound may be broadcast using the speaker 34 or, if interfaced to the mobile telephone 10, a hands-free headset. The audio output to the user may commence contemporaneously with the dialing of block 64, immediately before dialing has started, immediately after dialing has started, immediately after dialing has completed or at any other appropriate time.

In an embodiment where the audio data is stored by the first mobile telephone 10a, the audio data corresponding to the selected entry may be read out of the memory 18 and passed to the sound signal processing circuit 32 for conversion to an electrical signal to drive the speaker 34. Alternatively, the audio data may be transmitted to a wireless headset for decoding. In an embodiment where the audio is stored by a device other than the first mobile telephone 10a, the audio data may be downloaded or pushed to the first mobile telephone 10a for playback to the user.

In block 68, the first mobile telephone 10a may detect an off-hook condition of the second mobile telephone 10b. An off-hook condition may include the answering of the call, the call entering a voice mail system, the call being disconnected and so forth. Block 68 also may be satisfied if the user of the first mobile telephone 10a terminates the call.

Upon detection of the off-hook condition or the termination of the call, the method may proceed to block 70. In block 70, broadcasting of the audio corresponding to the call set-up audio data may be terminated to facilitate conversing with the user of the second mobile telephone 10, call another device, end use of the first mobile telephone 10a, etc. In another embodiment, the audio may be faded (e.g., broadcasting of the audio may continue, but at a reduced volume).

As will be appreciated, the foregoing method allows the user of the second mobile telephone 10b to configure what the user of the first mobile telephone 10a will hear during a call set-up period from the time when the call is initiated (block 64) to the time when the call is established (block 68). It is contemplated that, in most situations, the call set-up audio data will correspond to music. However, any audio content may be selected, such as dialog from a movie, a message spoken by the user of the second mobile telephone 10b, etc. The selected audio content associated with the call set-up audio data may be referred to as a personal ring tone (or personal ring song) associated with the entry selected in block 62.

Control options may be available to the user of the first mobile telephone 10a to override (e.g., not play or replace) the call set-up audio data selected by the user of the second mobile telephone 10b, control when playback is made, and so on. Another control option may allow the user to select between the method of FIG. 4 and the method of FIG. 5 described below, or modified versions of these methods.

Figure 5:
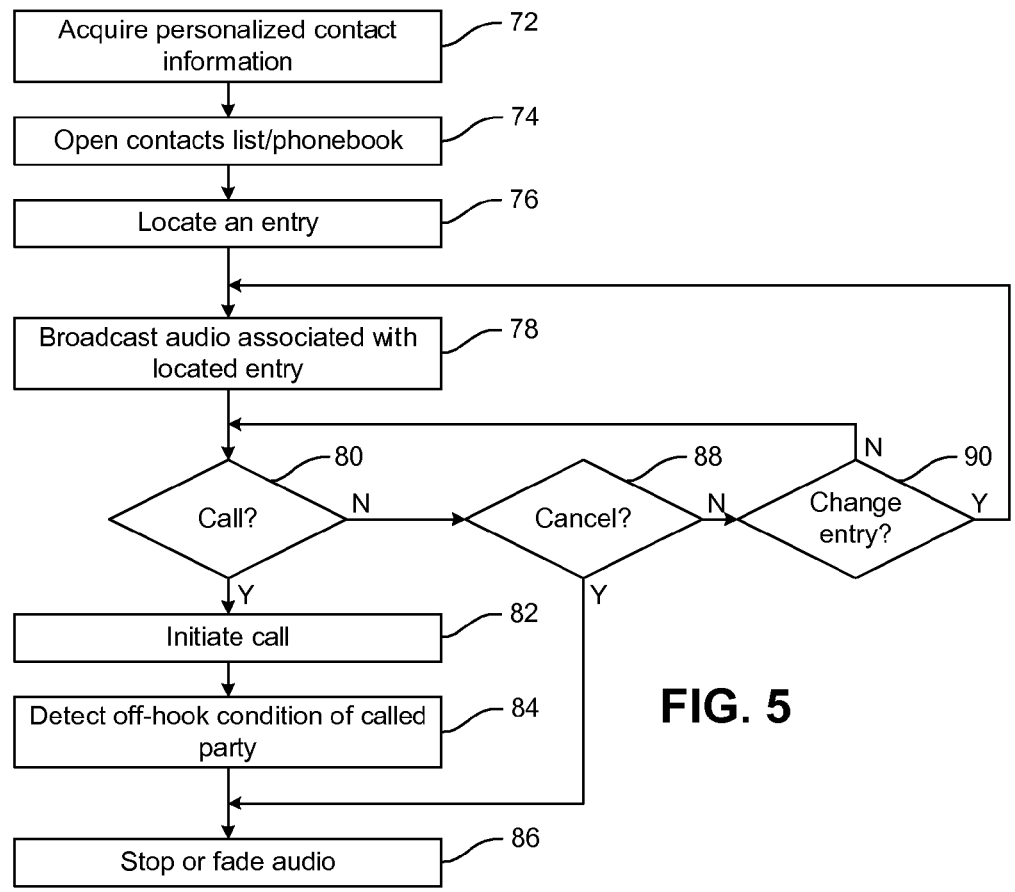
FIG. 5 is a flow chart showing another exemplary personalized call set-up scheme in accordance with the present invention.

With additional reference to FIG. 5, shown is a flow chart depicting another exemplary method of personalizing a call set-up to broadcast audio content selected by a person associated with contact information stored by the first mobile telephone 10a. The method may be embodied as executable code, such as in the form of the call set-up function 22. Some of the functional blocks of FIG. 5 are similar to the functional blocks of FIG. 4. In those cases, reference is made to the description associated with FIG. 4 for additional explanation of the corresponding functional blocks of FIG. 5.

The exemplary method if FIG. 5 may begin in step 72 where the first mobile telephone 10a acquires personalized information associated with the second mobile telephone 10b, including the call set-up audio data. The content of the personalized information and the manner of acquisition may be the same as described with respect to block 58.

The method may continue in block 74 where the user of the first mobile telephone 10a opens a contact list or phonebook. In block 76, through a user interface, the user may locate an entry, such as a entry corresponding to the second mobile telephone 10b. The act of locating an entry may be generally referred to as selecting the entry. For example, the user may scroll though a list of contacts to arrive at the located entry or may use a search function to locate the entry.

In block 78, the mobile telephone 10 may broadcast audio corresponding to the call set-up audio data for the located entry to the user of the mobile telephone 10. The sound may be broadcast in the same manner described with respect to block 66. In the method of FIG. 5, however, the located entry is not called at this point in the method. Rather, the audio is broadcast upon scrolling to the entry, reaching the entry using a search or otherwise selecting the entry. In this manner, the audio content may be used to audibly identify the entry prior to dialing. This embodiment also may allow the user of the first mobile telephone 10a to listen to the audio content associated with the entry at a time of the user's choosing and without necessarily calling the second mobile telephone 10b.

In one embodiment, the audio content is automatically played when the entry is located. In situations where the user is scrolling through entries at a relatively rapid pace, a delay between locating an entry and broadcasting the associated audio may be imposed. Such a delay may serve to avoid latency in scrolling (e.g., due the consumption of resources in the mobile telephone 10 by playing back audio content) and to avoid broadcasting very short portions of the audio content for each scrolled entry. In another embodiment, the audio content is played after both locating the entry and an additional user action to start the playback.

In block 80, a determination of whether the user has decided to call the located entry is made. If the user has taken action to call the telephone number associated with the entry, such as by pressing a call send button, the method may proceed to block 82 where the call is initiated. Thereafter, the method may proceed to block 84 to detect an off-hook condition or call termination. Detection of an off-hook condition or call termination may be made in the same manner as described with respect to block 68 of FIG. 4. After the detection of block 84, the method may proceed to block 86 to stop the audio broadcast or fade the audio broadcast in the manner that the audio is stopped or faded in block 70 of FIG. 4.

If the user does not call the located entry in block 80, the method may proceed to block 88. In block 88, a determination of whether the user has decided to stop playback of the audio content. If so, the method may proceed to block 86. If not, the method may proceed to block 90. In block 90, a determination of whether the user has changed the entry may be made. If so, the method may proceed to block 78 so that audio corresponding to the call set-up audio data of the newly located entry may be broadcast. If not, the method may return to block 80 to continue to broadcast the audio corresponding to the call set-up audio data of the currently located entry.

The functionality relating to the management and playback of audio content corresponding to call set-up audio data may be embodied as the call set-up function 22. Such functionality and any corresponding functions of a remote device or server may be embodied in any suitable form, including software, firmware, dedicated circuit components, computer readable media, machine usable media and so forth.

Although the illustrations appended hereto that show a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores, or messages may be added to the logical flow for purposes of enhanced utility, accounting, performance, measurement, troubleshooting, and the like. It is understood that all such variations are within the scope of the present invention.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of personalizing a call set-up of a mobile radio terminal, comprising:
    acquiring contact information associated with a callable device, the contact information including call set-up audio data corresponding to audio content selected by a user of the callable device, and storing the contact information as an entry in a database maintained by the mobile radio terminal;
    selecting the entry; and
    playing back on the mobile radio terminal the audio content corresponding to the call set-up audio data for the selected entry.

2. The method of claim 1, further comprising initiating a call to the device associated with the selected entry and wherein the playback is commenced only in association with the call initiation.

3. The method of claim 1, further comprising initiating a call to the device associated with the selected entry and stopping the playback upon detecting an off-hook condition of the called device.

4. The method of claim 1, further comprising initiating a call to the device associated with the selected entry after the playback has commenced.

5. The method of claim 1, wherein the playback is automatic upon selection of the entry.

6. The method of claim 1, wherein the call set-up audio data is a ring tone or audio file stored by the mobile radio terminal.

7. The method of claim 1, wherein the call set-up audio data is linked to a ring tone or audio file stored outside the mobile radio terminal.

8. The method of claim 7, wherein the playback includes receiving the ring tone or audio file from a communications network.

9. A computer readable medium storing a computer program, the program including a call set-up function executable by a mobile radio terminal, the program comprising executable logic to:
    acquire contact information associated with a callable device, the contact information including call set-up audio data corresponding to audio content selected by a user of the callable device, and store the contact information as an entry in a database maintained by the mobile radio terminal;
    select the entry; and
    playback on the mobile radio terminal the audio content corresponding to the call set-up audio data for the selected entry.

10. The computer readable medium of claim 9, wherein the program further comprises logic to initiate a call to the device associated with the selected entry and wherein the playback is commenced only in association with the call initiation.

11. The computer readable medium of claim 9, wherein the program further comprises logic to initiate a call to the device associated with the selected entry and stop the playback upon detecting an off-hook condition of the called device.

12. The computer readable medium of claim 9, wherein the program further comprises logic to initiate a call to the device associated with the selected entry after the playback has commenced.

13. The computer readable medium of claim 9, wherein the playback is automatic upon selection of the entry.

14. The computer readable medium of claim 9, wherein the call set-up audio data is a ring tone or audio file stored by the mobile radio terminal.

15. The computer readable medium of claim 9, wherein the call set-up audio data is linked to a ring tone or audio file stored outside the mobile radio terminal.

16. The computer readable medium of claim 15, wherein the playback logic includes logic to receive the ring tone or audio file from a communications network.

17. A mobile radio terminal, comprising:
    a radio circuit for exchanging data with a communications network; and
    a processor that executes logic to:
        acquire contact information associated with a callable device, the contact information including call set-up audio data corresponding to audio content selected by a user of the callable device, and store the contact information as an entry in a database maintained by the mobile radio terminal;

select the entry; and playback on the mobile radio terminal the audio content corresponding to the call set-up audio data for the selected entry.

18. The mobile radio terminal of claim 17, wherein the processor executes logic to initiate a call to the device associated with the selected entry and wherein the playback is commenced only in association with the call initiation.

19. The mobile radio terminal of claim 17, wherein the processor executes logic to initiate a call to the device associated with the selected entry and stop the playback upon detecting an off-hook condition of the called device.

20. The mobile radio terminal of claim 17, wherein the processor executes logic to initiate a call to the device associated with the selected entry after the playback has commenced.

21. The mobile radio terminal of claim 17, wherein the playback is automatic upon selection of the entry.

22. The mobile radio terminal of claim 17, wherein the call set-up audio data is a ring tone or audio file stored by a memory the mobile radio terminal.

23. The mobile radio terminal of claim 17, wherein the call set-up audio data is linked to a ring tone or audio file stored outside the mobile radio terminal.

24. The mobile radio terminal of claim 23, wherein the playback logic includes logic to receive the ring tone or audio file from a communications network.

* * * * *